United States Patent Office 3,436,409
Patented Apr. 1, 1969

3,436,409
EPOXIDATION PROCESS
Fred N. Hill and Joseph P. Henry, South Charleston, W. Va., assignors to Union Carbide Corporation, a corporation of New York
No Drawing. Filed Dec. 30, 1964, Ser. No. 422,442
Int. Cl. C07d 1/08
U.S. Cl. 260—348.5  15 Claims

ABSTRACT OF THE DISCLOSURE

A process for producing an epoxide which comprises contacting an olefinically unsaturated compound containing at least one epoxidizable olefinic double bond with thallic oxide at a temperature of from about 75° C. to about 400° C., whereby at least a portion of the olefinically unsaturated compound is converted to its epoxide and at least a portion of the thallic oxide is reduced to thallous oxide. The thallous oxide may be regenerated to thallic oxide, which may be used to continue the epoxidation reaction.

---

This invention is concerned with producing organic vic-epoxy compounds. More particularly, this invention relates to a method for oxidizing olefinically-unsaturated compounds to vic-epoxy compounds.

In the past, epoxides have been produced by a variety of methods. Of these methods, the most common comprises contacting an olefin with an oxidizing agent to produce the corresponding vic-epoxy compound, as is illustrated by the equation:

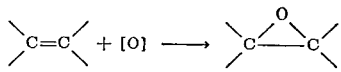

The oxidizing agents which have been employed include hydrogen peroxide, peracids such as peracetic acid, and oxygen in combination with a catalyst.

It is an object of this invention to provide a novel oxidizing agent for converting olefins to epoxides.

It is a further object of this invention to provide a novel catalyst for the oxidation of olefins to epoxides with molecular oxygen.

These and other objects are broadly achieved by contacting an organic compound containing at least one epoxidizable olefinic double bond with thallic oxide (Tl₂O₃) at an elevated temperature. The olefinic double bond is converted to an oxirane ring $$\left( \underset{/}{\overset{\backslash}{C}} \underset{\diagdown}{\overset{O}{\diagup}} \underset{\backslash}{\overset{/}{C}} \right)$$

and the thallic oxide is reduced to thallous oxide (Tl₂O). If the process is conducted in an oxidizing atmosphere, the thallous oxide is reoxidized to thallic oxide, thereby providing an essentially catalytic process.

The use of thallium salts as oxidation catalysts is known. Thus, Grinstead, in U.S. Patent 3,048,636 and J. Org. Chem., 26, 230–40 (1961), discloses that thallic salts catalyze an aqueous-phase oxidation of an olefin to form a glycol, a ketone or an aldehyde, via the reaction of water with the olefin. In the process of this invention, however, thallic oxide reacts directly with the olefin to produce an epoxide.

The compounds which can be epoxidized in accordance with this invention are those having an olefinic double bond

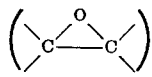

provided they are fluids, i.e., gaseous or liquid, at the reaction conditions. Preferred are hydrocarbons containing from one to two olefinic double bonds and no other non-aromatic, i.e., olefinic or acetylenic, unsaturation and having from 2 to about 20 carbons, such as ethylene, propylene, cyclohexene, styrene, butadiene, cyclopentadiene, dicyclopentadiene, vinylcyclohexene and the like. The process of this invention is especially useful in epoxidizing propylene, which, until this invention, could not be catalytically oxidized to propylene oxide.

Thallic oxide can be employed in any convenient physical form, for example in a powdered, tableted or supported form. It is preferred, however, that the oxide be distributed on a support material. The nature of the support is not critical to this invention, provided, of course, that the support is inert under the reaction conditions and has sufficient physical strength under the reaction conditions to have a practical life. Suitable support materials include alumina, silica, silicon carbide, diatomaceous earths, carbon and the like. The thallic oxide can be deposited on the support material in any suitable manner. One technique comprises slurrying thallic oxide and the support in water followed by evaporation of the slurry to dryness. It is not necessary, however, that the thallic oxide be fully dehydrated before use in the process of this invention.

The conditions of residence time, temperature and pressure are not narrowly critical. Thus, although the pressure can be varied from sub- to superatmospheric pressure, atmospheric or autogenous pressure is generally employed because no particular advantage is gained from reduced or increased pressures. The reaction temperature can vary widely, and temperatures in the range of from about 75° C. to about 400° C. have been found suitable. Optimum temperatures will depend upon the mode of operation. For example, when Tl₂O₃ is employed as a reactant, temperatures within the entire range can be employed. When the reaction is conducted in an oxygen-containing atmosphere, however, temperatures in the higher portion of this range, for example, above 200° C., are preferred. The residence time is not highly critical, and can vary from 0.1 second or less to several minutes or longer. Residence times of from about 1 second to about 5 minutes have been found preferable, however, with times of from about 10 seconds to about 3 minutes being especially preferred.

As is indicated above, thallous oxide is produced during the epoxidation reaction. Thallic oxide can be regenerated by known techniques, for example chemically, as by reaction with molecoular oxygen, hydrogen peroxide and the like, or by electrolytic methods. In the latter technique, advantage is taken of the water solubility of thallous oxide in the form of thallous hydroxide. When an electric current is passed through an aqueous solution of thallous hydroxide and a support electrolyte, thallous ions are oxidized to thallic ions, with the formation of insoluble thallic oxide, which precipitates from the aqueous solution. Suitable supporting electrolytes are known, and include water-soluble inorganic salts such as sodium or potassium chlorides, sodium sulfate and the like, and water-soluble organic salts such as tetramethylammonium iodide and the like.

The regeneration of thallic oxide can be effected subsequent to the epoxidation reaction or, if desired, may be conducted concurrently with the epoxidation by maintaining the thallium oxides in an oxidizing atmosphere. In the latter case it is preferred to oxidize the thallous oxide as soon as it is formed to thallic oxide, thereby providing an essentially catalytic reaction.

For example, thallous oxide will react with molecular oxygen to produce thallic oxide over essentially the same temperature range as that at which the epoxidation reaction occurs. Thus, one can feed molecular oxygen to the reaction zone, either in admixture with or separately from the olefin being epoxidized. The amount of oxygen should be at least the stoichiometric amount necessary to reoxidize the thallous oxide or at least 0.5 mole of oxygen per olefinic double bond which is epoxidized. In practice, during a catalytic operation of this nature, from about 0.05 to about 5.0 moles of oxygen per molar equivalent of olefinic compound are employed. By the term "molar equivalent," as employed herein, is meant the number of olefinic double bonds present in the compound being epoxidized. Thus, one mole of a diolefin comprises two molar equivalents of an olefin.

When molecular oxygen is employed, it can be supplied to the reaction either as pure oxygen or diluted with one or more inert diluents, for example, nitrogen. As is a convenient source of oxygen. The partial pressure of oxygen, like total pressure, is not highly critical to the process of this invention, and can range from about 0.5 p.s.i.a. to about 200 p.s.i.a. or higher, with partial pressures in the range of from about 0.75 p.s.i.a. to about 150 p.s.i.a. being preferred.

The process of this invention, with or without concurrent thallic oxide regeneration, can be effected by any of several techniques. For example, the thallic oxide can be present in the reaction zone in a fixed bed, a fluidized bed or in the form of a slurry in an inert diluent. Suitable diluents which can be employed include water, octane, benzene, toluene and the like, although nonaqueous diluents are preferred. Water is undesirable primarily because thallous oxide forms a basic solution which inhibits the formation of epoxides. Water can be employed, however, if the thallous oxide is converted to thallic oxide as it is formed, as by the electrolytic oxidation referred to above.

When thallic oxide regeneration is not effected concurrently with the epoxidation reaction, the process may be carried out in a cyclic or a continuous manner. For example, if a fixed bed of thallic oxide is employed, it will be necessary to reactivate the bed periodically, thus providing a cyclic operation. If, however, a fluidized bed or a slurry of thallic oxide is employed, a portion of at least partially reduced thallium oxide can be removed from the reactor, reactivated in a separate vessel and the reactivated thallic oxide returned to the reactor. Other combinations and variations will occur to the skilled artisan.

The following examples are illustrative.

Example 1

A vertical 1.5-inch I.D. glass tube was packed with 100 grams of thallic oxide on a particulate fused silica support, providing a reaction zone of 7 inches in depth. The tube also contained fused silica particles to a depth of 12 inches above and 5 inches below the thallic oxide bed. The entire packed height of the tube was surrounded by a tube heater, and was heated to 81° C., as determined by a thermocouple located in an axially-mounted thermowell in the bed. Propylene, at a pressure of slightly above 1 atmosphere, was then fed downwardly through the bed at a rate of 1 liter per hour, for a residence time of 273 seconds. The effluent gas was withdrawn from the bottom of the tube and subjected to gas chromatographic analysis. Propylene oxide was produced in a maximum, instantaneous yield of 1.2 percent at an efficiency of 70 percent. The reaction was continued for a period of 3 hours, during which time the yield of propylene oxide decreased due to the reduction of the thallic oxide which, at the end of this period, was too depleted to support significant conversions of propylene to propylene oxide. Additional runs were conducted under similar conditions, except that the reaction temperature was varied. The results of these runs are summarized in tabular form below, together with the results of the above-described run as Run No. 1.

TABLE I

| Run No. | Temp., °C. | Maximum conversion of propylene, percent | Maximum propylene oxide yield, percent | Efficiency, percent |
|---|---|---|---|---|
| 1 | 81 | 1.7 | 1.2 | 70 |
| 2 | 87 | 1.5 | 1.0 | 67 |
| 3 | 107 | 0.69 | 0.55 | 80 |

The products, other than propylene oxide, which were formed were carbon dioxide and water.

Example 2

Employing apparatus and procedures similar to those described in Example 1, except that ethylene was substituted for propylene, several runs were carried out. The results of these runs are summarized in Table II.

TABLE II

| Run No. | Temp., °C. | Maximum conversion of ethylene, percent | Maximum yield of ethylene oxide, percent | Efficiency, percent |
|---|---|---|---|---|
| 1 | 90 | 0.60 | 0.40 | 67 |
| 2 | 91 | 0.55 | 0.35 | 64 |
| 3 | 132 | 2.14 | 1.8 | 84 |

Example 3

Employing apparatus and procedures similar to those described in Example 1, oxygen and propylene were fed concurrently to the reactor at a temperature of 234° C. and in an oxygen-to-propylene mole ratio of 1:1. The conversion of propylene to propylene oxide, carbon dioxide and water was 0.7 percent, and the yield was 0.12 percent, for an efficiency of 17 percent.

In a similar experiment, except that the bed consisted solely of the silica support and contained no thallic oxide, no propylene oxide or carbon dioxide could be found in the effluent stream. Thus, it is clear that thallic oxide does function as a catalyst for the oxygen-epoxidation of propylene.

Example 4

Employing apparatus and procedures similar to those described in Example 1, oxygen and ethylene were fed concurrently to the reactor at 275° C. in an oxygen-to-ethylene mole ration of 5:1. The conversion of ethylene to ethylene oxide, water and carbon dioxide was 1.75 percent and the yield of ethylene oxide was 0.21 percent, for an efficiency of 12 percent.

What is claimed is:

1. The process for producing an epoxide which comprises contacting an olefinically-unsaturated compound containing at least one epoxidizable olefinic double bond with thallic oxide at a temperature of from about 75° C. to about 400° C., at which temperature the olefinically unsaturated compound is gaseous or liquid, whereby at least a portion of said olefinically-unsaturated compound is converted to its epoxide and at least a portion of said thallic oxide is reduced to thallous oxide.

2. The process for producing an epoxide by the oxidation of an olefinically unsaturated compound containing at least one epoxidizable olefinic double bond, which comprises the steps of (1) contacting said olefinically-unsaturated compound with thallic oxide at a temperature of from about 75° C. to about 400° C., whereby at least a portion of said olefinically-unsaturated compound is converted to its epoxide and at least a portion of said thallic oxide is reduced to thallous oxide, (2) oxidizing said thallous oxide to form thallic oxide, and (3) continuing step (1) with regenerated thallic oxide from step (2).

3. The process as claimed in claim 2 wherein the oxidation of thallous oxide is effected subsequent to said step (1).

4. The process as claimed in claim 2 wherein the oxidation of thallous oxide is effected concurrently with step (1).

5. The process for producing an epoxide by the oxidation of an olefinically-unsaturated compound containing at least one epoxidizable olefinic double bond, which comprises contacting an admixture of said olefinically-unsaturated compound and from about 0.05 to about 5 moles of oxygen per molar equivalent of olefinically-unsaturated compound with thallic oxide at a temperature of from about 75° C. to about 400° C., at which temperature the olefinically-unsaturated compound is gaseous or liquid, whereby at least a portion of said olefinically-unsaturated compound is converted to its epoxide.

6. The process for producing an epoxide by the oxidation of an olefinically-unsaturated hydrocarbon containing from 2 to 20 carbons and having no non-aromatic unsaturation other than from 1 to 2 olefinic double bonds which comprises contacting said olefinically-unsaturated hydrocarbon with thallic oxide at a temperature of from about 75° C. to about 400° C., at which temperature the olefinically-unsaturated hydrocarbon is gaseous or liquid, whereby at least a portion of said olefinically-unsaturated hydrocarbon is converted to its epoxide and at least a portion of said thallic oxide is reduced to thallous oxide.

7. The process for producing an epoxide by the oxidation of an olefinically-unsaturated hydrocarbon containing from 2 to 20 carbons and having no non-aromatic unsaturation other than from 1 to 2 olefinic double bonds which comprises the steps of (1) contacting said olefinically-unsaturated hydrocarbon with thallic oxide at a temperature of from about 75° C. to about 400° C., at which temperature the olefinically-unsaturated hydrocarbon is gaseous or liquid, whereby at least a portion of said olefinically-unsaturated hydrocarbon is converted to its epoxide and at least a portion of said thallic oxide is reduced to thallous oxide, (2) oxidizing said thallous oxide to form thallic oxide, and (3) continuing step (1) with regenerated thallic oxide from step (2).

8. The process as claimed in claim 7 wherein the oxidation of thallous oxide is effected subsequent to step (1).

9. The process as claimed in claim 8 wherein the oxidation of thallous oxide is effected concurrently with step (1).

10. The process for producing an epoxide by the oxidation of an olefinically-unsaturated hydrocarbon containing from 2 to 20 carbons and having no non-aromatic unsaturation other than from 1 to 2 olefinic double bonds which comprises contacting an admixture of said olefinically-unsaturated hydrocarbon and from about 0.5 to about 5 moles of oxygen per molar equivalent of olefinically-unsaturated hydrocarbons with thallic oxide at a temperature of from about 75° C. to about 400° C., at which temperature the olefinically-unsaturated hydrocarbon is gaseous or liquid, whereby at least a portion of said olefinically-unsaturated hydrocarbon is converted to its epoxide.

11. The process for producing propylene oxide from propylene which comprises contacting propylene with thallic oxide at a temperature of from about 75° C. to about 400° C., whereby at least a portion of said propylene is converted to propylene oxide and at least a portion of said thallic oxide is reduced to thallous oxide.

12. The process for producing propylene oxide from propylene which comprises the steps of (1) contacting propylene with thallic oxide at a temperature of from about 75° C. to about 400° C., whereby at least a portion of said propylene is converted to propylene oxide and at least a portion of said thallic oxide is reduced to thallous oxide, (2) oxidizing said thallous oxide to form thallic oxide, and (3) continuing step (1) with regenerated thallic oxide from step (2).

13. The process as claimed in claim 12 wherein the oxidation of thallous oxide is effected subsequent to step (1).

14. The process as claimed in claim 12 wherein the oxidation of thallous oxide is effected simultaneously with step (1).

15. The process for producing propylene oxide from propylene which comprises contacting an admixture of propylene and from about 0.5 to about 5 moles of oxygen per mole of propylene with thallic oxide at a temperature of from about 75° C. to about 400° C., whereby at least a portion of said propylene is converted to propylene oxide.

References Cited
UNITED STATES PATENTS 3,020,293  2/1962  Schonberg et al. _____ 260—348
3,048,636  8/1962  Grinstead _____ 260—586

OTHER REFERENCES

Die Naturwissenschaften, vol. 49, pp. 104–5 (1962).

NORMA S. MILESTONE, *Primary Examiner.*